United States Patent
Hussain et al.

(10) Patent No.: US 10,075,095 B2
(45) Date of Patent: Sep. 11, 2018

(54) TRANSFORMERLESS AC LINE ISOLATOR

(71) Applicant: Apple Inc., Cupertino, CA (US)

(72) Inventors: Asif Hussain, San Jose, CA (US);
Behzad Mohtashemi, Cupertino, CA (US); Manisha P. Pandya, Saratoga, CA (US); Mohammad J. Navabi-Shirazi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 15/148,245

(22) Filed: May 6, 2016

(65) Prior Publication Data
US 2016/0329830 A1    Nov. 10, 2016

Related U.S. Application Data

(60) Provisional application No. 62/158,347, filed on May 7, 2015.

(51) Int. Cl.
*H02M 7/44* (2006.01)
*H02M 7/537* (2006.01)
(Continued)

(52) U.S. Cl.
CPC .............. *H02M 7/537* (2013.01); *H02M 1/08* (2013.01); *H02M 3/158* (2013.01);
(Continued)

(58) Field of Classification Search
CPC . H02M 2007/4815; H02M 2007/4818; H02M 1/083; H02M 3/33507;
(Continued)

(56) References Cited

U.S. PATENT DOCUMENTS

| 5,270,913 A | 12/1993 | Limpaecher |
| 5,434,479 A * | 7/1995 | Ohnishi ............. H05B 41/2883 315/209 R |

(Continued)

FOREIGN PATENT DOCUMENTS

| CN | 103956903 A | 7/2014 |
| WO | 2011008567 A2 | 1/2011 |

*Primary Examiner* — Adolf Berhane
*Assistant Examiner* — Afework Demisse
(74) *Attorney, Agent, or Firm* — Blank Rome LLP

(57) ABSTRACT

Various systems, apparatuses, and methods are disclosed herein, which provide a new power conversion topology for isolated systems that does not include a transformer. Embodiments of the inventive systems comprise: a switching system utilizing high voltage, low leakage switches, e.g., Silicon Carbide (SiC) MOS-FETs; a power source; an inductor and a capacitor operating as a link stage resonant LC circuit; and a load. The switching system may be configured to be controlled in a synchronized 'four phase' control loop process, wherein the input switches are prevented from being closed at the same time as the output switches, thereby providing electrical isolation between the input power source and the load—without the use of a transformer. The techniques disclosed herein are applicable to any number of isolated systems that supply power to electronic systems such as: digital cameras, mobile phones, watches, personal data assistants (PDAs), portable music players, displays, and computers.

20 Claims, 9 Drawing Sheets

(51) Int. Cl.
*H02M 1/08* (2006.01)
*H02M 3/158* (2006.01)
*H02M 1/00* (2006.01)

(52) U.S. Cl.
CPC ............... *H02M 2001/0009* (2013.01); *H02M 2001/0058* (2013.01); *Y02B 70/1425* (2013.01); *Y02B 70/1483* (2013.01); *Y02B 70/1491* (2013.01)

(58) Field of Classification Search
CPC ........ H02M 3/285; H02M 7/49; H02M 7/493; H02M 3/28; H02M 3/315
See application file for complete search history.

(56) References Cited

U.S. PATENT DOCUMENTS

| | | | |
|---|---|---|---|
| 5,805,436 A | 9/1998 | Lin | |
| 2011/0267863 A1 | 11/2011 | Rigbers | |
| 2012/0307531 A1 | 12/2012 | Toliyat | |
| 2014/0265844 A1* | 9/2014 | Sadwick | ............ H05B 33/0815 315/85 |

* cited by examiner

TRANSFORMERLESS AC LINE ISOLATOR

CROSS-REFERENCE TO RELATED APPLICATION

This application claims priority to U.S. Provisional Application No. 62/158,347, filed May 7, 2015, the contents of which are entirely incorporated by reference herein.

BACKGROUND

This disclosure relates generally to the field of power conversion for isolated systems. More particularly, this disclosure relates to an improved power conversion topology providing a transformerless alternating current (AC) line isolator.

In isolated systems, like flyback converters, the input circuitry (i.e., the "Primary Circuit") and the output circuitry (i.e., the "Secondary Circuit") are electrically isolated, i.e., not electrically/galvanically connected to each other. Flyback converters are commonly used as isolated battery chargers and/or front-end AC-DC and DC-DC converters in switch mode power supply applications. For example, a common flyback converter is a buck-boost converter including an inductor (transformer). A primary winding of the transformer is coupled to the input circuitry, and a secondary winding of the transformer is coupled to the output circuitry, thus providing the desired isolation between the input circuitry and the output circuitry.

Transformers provide the basic safety isolation (e.g., up to about 3,000 volts) in standard power converters, but have some design trade-offs. For example, transformers of the sizes used in these applications have only roughly 90% efficiency and are very challenging in terms of their construction and manufacturing. Further, transformers occupy a relatively large amount of volume and add a large z-height (i.e., depth) requirement to the design of AC-DC adapters.

In the embodiments described herein, systems and methods are proposed by which a transformerless AC line isolator is provided, which both significantly reduces losses in power conversion and allows for the miniaturization of the power converter design, due, at least in part, to the lack of the presence of a transformer.

SUMMARY

Described herein are various systems, methods and apparatuses for an improved power converter, comprising: a switching system utilizing high voltage, low leakage switches, e.g., Silicon Carbide metal-oxide-semiconductor field-effect transistor (SiC MOS-FETs); a power source; an inductor and a capacitor operating as a link stage resonant LC circuit; and a load. By utilizing high-voltage, low-leakage MOS-FETS, such as SiC MOS-FETs, along with a resonant tank circuit operating in QR mode to replace the transformer found in standard power converters, the power converter embodiments described herein show significantly reduced power losses, resulting in high efficiency conversion.

In some embodiments described herein, the power conversion circuit comprises: a power source; four switches; an inductor; a capacitor; and a load. The four switches may be configured to be controlled in a synchronized 'four phase' control loop process, providing the transformerless AC line isolation properties referred to herein.

Phase I

In the first phase if the synchronized control loop process (as will be discussed in further detail below with reference to element 300a of FIG. 3), the first two switches (also referred to herein as "input switches" or "input switching device") close, and the inductor becomes energized by the power source. When the peak inductor current reaches the threshold level set by the control loop, the two input switches turn off and disconnect the power source from the inductor, thus initiating the second phase.

Phase II

In Phase II (as will be discussed in further detail below with reference to element 300b of FIG. 3), once the two input switches have turned off, a resonant tank circuit, comprising the inductor and capacitor, will resonate, and the switch node voltage (referred to herein as "V(N1)" or "V(N2)–V(N1)") will move up and down at the resonant frequency of the tank circuit. When the voltage at the switch node reaches the desired output voltage, the second pair of switches (also referred to herein as "output switches" or "output switching device") closes, initiating the third phase of the control loop.

Phase III

In Phase III (as will be discussed in further detail below with reference to element 300c of FIG. 3), once the two output switches have turned on, the inductor, i.e., the energy storage element, discharges to the output. The two output switches may stay on until all the energy is transferred to the output, and then they are opened, isolating the switch node from the load, initiating the fourth phase of the control loop.

Phase IV

During Phase IV (as will be discussed in further detail below with reference to element 300d of FIG. 3), the switch node resonates with the frequency determined by the time constant of the LC circuit. When the voltage of the switch node reaches the input voltage, then the first two pairs of input switches are turned on again, and the cycle repeats itself again, starting at Phase I.

Thus, according to some embodiments described herein, an electrically-isolated power conversion circuit is disclosed, comprising: a link stage incorporating a resonant LC circuit, the resonant LC circuit comprising a first inductor and a first capacitor; an input stage comprising at least two simultaneously operated input switching devices that, in their closed position, couple the resonant LC circuit to an input power source and that, in their open position, de-couple the resonant LC circuit from the input power source; an output stage comprising at least two simultaneously operated output switching devices that, in their closed position, couple the resonant LC circuit to a load and that, in their open position, de-couple the resonant LC circuit from the input power source; and a control system operatively coupled to the input and output stages configured to prevent the input switching devices and the output switching devices from closing at the same time, thereby providing electrical isolation between the input power source and the load without the use of a transformer.

In still other embodiments described herein, a method of operating an electrically isolated, transformerless power conversion circuit through a power cycle is disclosed, comprising: closing the input switching devices to transfer energy to the resonant LC circuit; opening the input switching devices thereby allowing the resonant LC circuit to begin resonating; allowing the resonance to continue until the voltage across the resonant LC circuit inverts, and then closing the output switching devices, thereby transferring energy from the resonant LC circuit to the load; opening the output switching devices when the current from the resonant LC circuit to the load reaches zero; and allowing the resonant LC circuit to continue resonating until the voltage across the resonant LC circuit again inverts, and then closing the input switching devices under a zero voltage condition.

According to still other embodiments described herein, an electrically-isolated power conversion circuit is disclosed, comprising: a power source for generating an input voltage; a power converter comprising: an input system; and output system; and one or more switching devices, the one or more switching devices further comprising first input switching devices and first output switching devices; a controller configured to operate the one or more switching devices, so as to convert an input voltage of the input system to a regulated output voltage for delivery to a load in the output system according to a control loop process, wherein: a first phase of the control loop process comprises: closing the first input switching devices to transfer energy from the power source to a resonant LC circuit, wherein the resonant LC circuit is connected between the power source and the load; and opening the first output switching devices to electrically isolate the load from the input voltage; a second phase of the control loop process comprises: opening the first input switching devices to allow the resonant LC circuit to resonate until a voltage across the resonant LC circuit inverts; a third phase of the control loop process comprises: closing the first output switching devices to transfer energy from the resonant LC circuit to the load; and a fourth phase of the control loop process comprises: opening the output switching devices when a current from the resonant LC circuit to the load reaches zero; allowing the resonant LC circuit to continue resonating until the voltage across the resonant LC circuit again inverts; and closing the input switching devices under a zero voltage condition.

DESCRIPTION

Various systems, apparatuses, and methods are disclosed herein, which provide a new power conversion topology for isolated systems that does not include a transformer. Embodiments of the inventive systems comprise: a switching system utilizing high voltage, low leakage switches, e.g., SiC MOS-FETs; a power source; an inductor and a capacitor operating as a link stage resonant LC circuit; and a load. The switching system may be configured to be controlled in a synchronized 'four phase' control loop process, wherein the input switches are prevented from being closed at the same time as the output switches, thereby providing electrical isolation between the input power source and the load without the use of a transformer. The techniques disclosed herein are applicable to any number of isolated systems that supply power to electronic systems such as: digital cameras, mobile phones, watches, personal data assistants (PDAs), portable music players, displays, as well as desktop, laptop, and tablet computers.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

A typical AC-DC power converter circuit utilizes a transformer, e.g., either flyback or QR, to provide galvanic isolation between an input system (i.e., power source) and a load. However, as mentioned above, due to the relatively high cost and high profile of transformers, many implementations could benefit from a transformerless AC line isolator, such as is disclosed in the various embodiments described herein.

Figure 1:
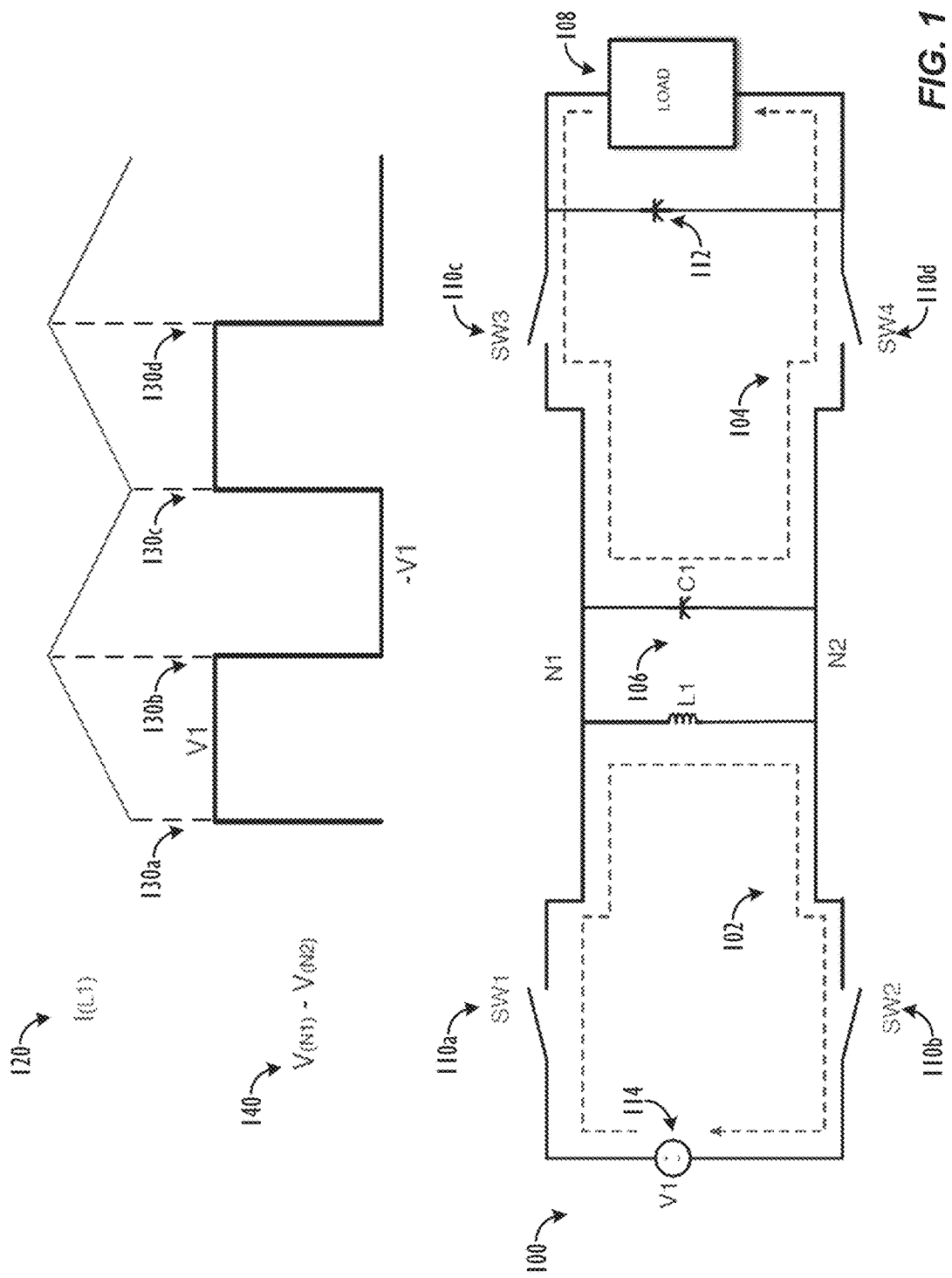
FIG. 1 illustrates an exemplary simplified circuit design for a transformerless AC line isolator and corresponding signal graphs, in accordance with one embodiment.

Referring now to FIG. 1, an exemplary simplified circuit design 100 for a transformerless AC line isolator and several corresponding signal graphs are illustrated, in accordance with one embodiment. Circuit 100 comprises an input stage 102 having a power source 114, a link stage incorporating a resonant LC circuit 106, and an output stage having a capacitor 112 and load 108. Also shown in circuit 100 are a series of four switches 110a-110d, whose role in the transformerless AC line isolator circuit will be described in greater detail below.

Dashed line 102 represents the input stage of the circuit that will be used to charge inductor L1 when input switch 1, SW1 (110a), and input switch 2, SW2 (110b) are closed and output switch 3, SW3 (110c), and output switch 4, SW4 (110d) are open. Likewise, dashed line 104 represents the output stage of the circuit that will be used to power load 108 using capacitor 112 when input switch 1, SW1 (110a), and input switch 2, SW2 (110b) are open and output switch 3, SW3 (110c), and output switch 4, SW4 (110d) are closed. Finally, link stage 106 represents the resonant LC circuit that will resonate when each of switches SW1-SW4 (110a-110d) are opened, before input switch 1, SW1 (110a), and input switch 2, SW2 (110b) are closed again to restart the cycle. N1 and N2 represent the "switch node," and the voltage across these nodes will be used to inform the timing of the aforementioned synchronized 'four phase' control loop switching process.

Signal graph 120 represents the rising and falling current through the inductor, L1, of circuit 100. Signal graph 140 represents the voltage differential between the switching nodes N1 and N2. As is illustrated in FIG. 1, when switches SW1 (110a) and SW2 (110b) are closed, the inductor, L1, current ramps up. When switches SW3 (110c) and SW4 (110d) are closed, though, the energy is transferred to the output stage, and the inductor current ramps down. The changing current into and out of the inductor L1 is thus synchronized with the oscillation of the switch node voltage from V1 to −V1, e.g., changing directions at time points 130a-130d.

Figure 2:
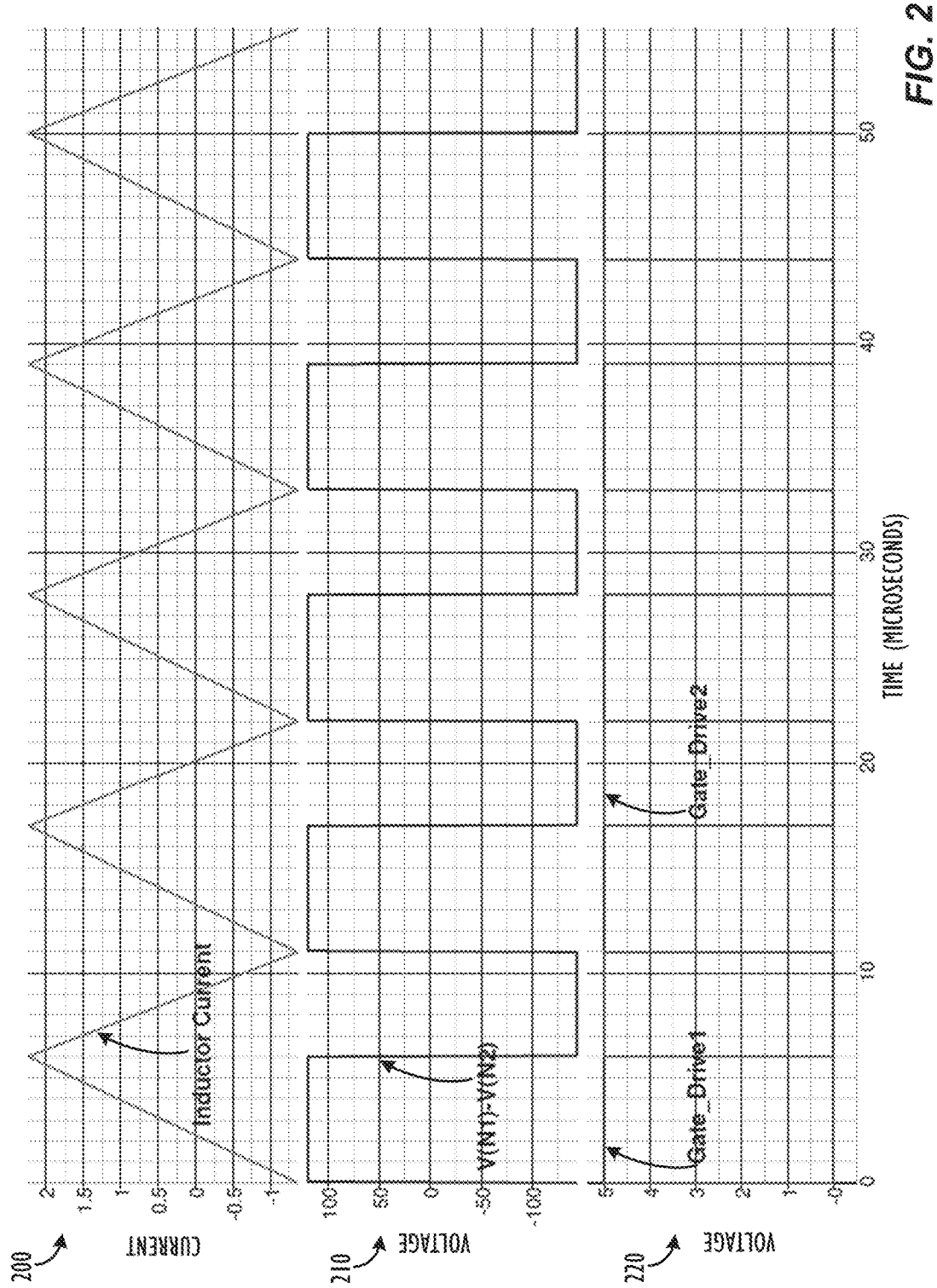
FIG. 2 illustrates exemplary signal graphs for a transformerless AC line isolator not utilizing a resonance LC tank circuit, in accordance with one embodiment.

Referring now to FIG. 2, exemplary signal graphs 200/210/220 for a transformerless AC line isolator not utilizing a resonance LC tank circuit are illustrated, in accordance with one embodiment. Signal graph 200 represents the inductor, L1, current over time. As is shown, the current in the inductor may oscillate between typical values of around −2 A to 2 A, depending on that status and timing of the opening and closing of the input and output switching devices. Signal graph 210 represents the switch node voltage, V(N1)−V(N2), over time. As is shown, the switch node may oscillate between typical values of around −120V to 120V, depending on that status and timing of the opening and closing of the input and output switching devices. Finally, signal graph 220 represents the changing gate drive voltages over time. As is shown, the gate drives may operate at typical 5V levels. As may now be appreciated, according to the exemplary signal graphs 200/210/220 for a transformerless AC line isolator not utilizing a resonance LC tank circuit, the Gate Drive 1 signal (operating the input stage gates) and the Gate Drive 2 signal (operating the output stage gates) turn on and turn off immediately, for the minimum amount of 'dead' time. However, because of this switching scheme, switching losses dominate the efficiency profile, and the efficiency is, at best, found to be around 65%.

Figure 3:
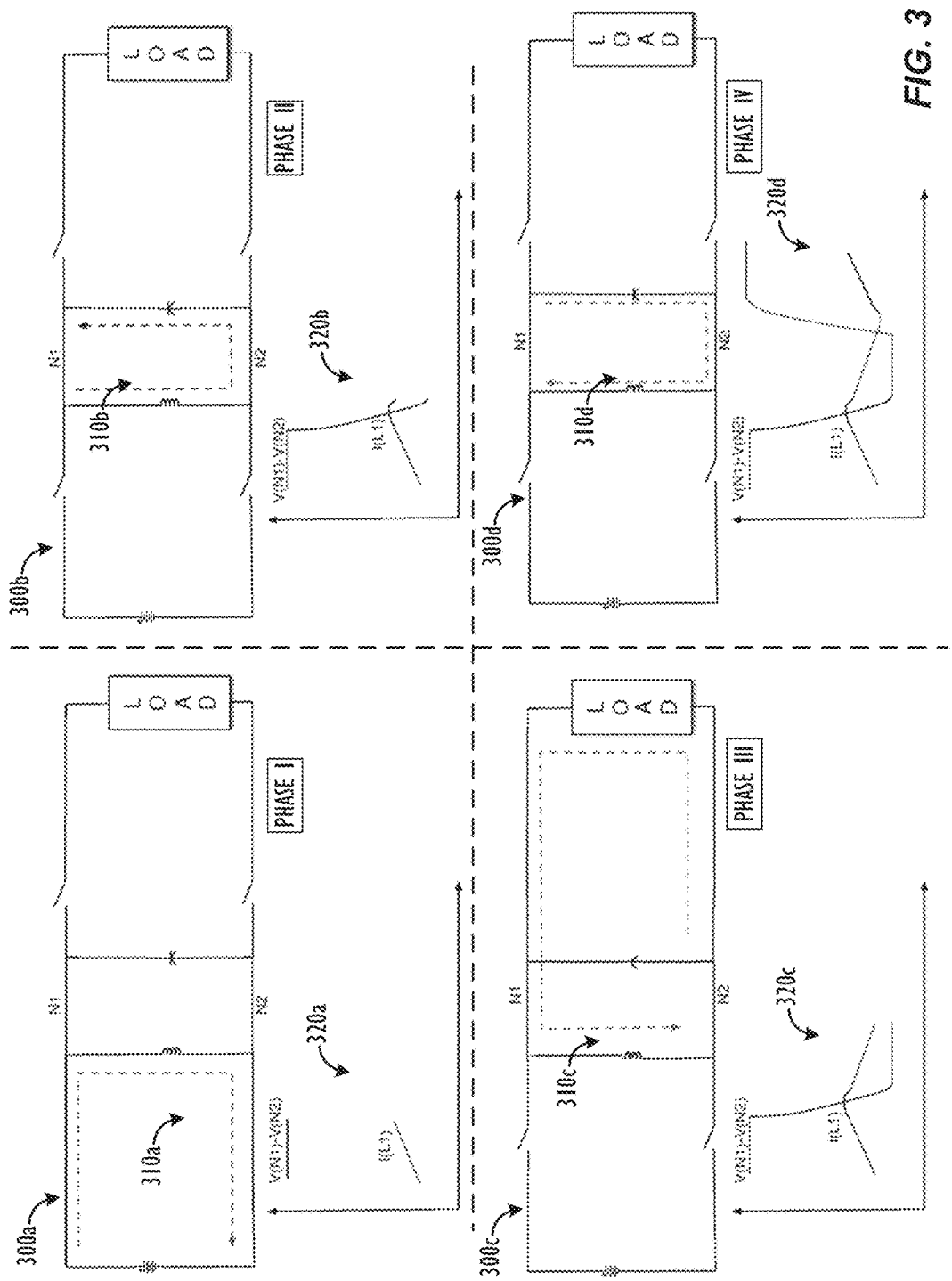
FIG. 3 illustrates an exemplary simplified circuit design for a transformerless AC line isolator utilizing a four phase, zero-voltage switching (ZVS) control loop process, in accordance with one embodiment.

Referring now to FIG. 3, an exemplary simplified circuit design 300 for a transformerless AC line isolator utilizing a four phase, zero-voltage switching (ZVS) control loop process is illustrated, in accordance with one embodiment. As mentioned above, according to some embodiments, the control loop process may be conceptually divided into 'four phases,' controlled by a synchronized switching protocol.

In so-called "Phase I," represented by circuit 300a, the first two switches, i.e., the input switches, close, and the inductor becomes energized by the power source, as shown by current path 310a. When the peak inductor current reaches the threshold level set by the control loop, the two input switches turn off and disconnect the power source from the inductor, thus initiating the second phase. This process of the inductor current ramping up while the switch node voltage (i.e., V(N1)−V(N2)) is high during this phase is also illustrated in signal graph 320a.

In so-called "Phase II," represented by circuit 300b, once the two input switches have turned off, a resonant tank circuit, comprising the inductor and capacitor, as shown by current path 310b, will resonate, and the switch node voltage will move up and down at the resonant frequency of the tank circuit. When the voltage at the switch node reaches the output voltage, the output switches will close, initiating the third phase of the control loop. This process of the inductor current beginning to ramp down as the switch node voltage reaches the output voltage during this phase is also illustrated in signal graph 320b.

In so-called "Phase III," represented by circuit 300c, once the two output switches have turned on, the inductor, i.e., the energy element, is connected to the output, as shown by current path 310c. The two output switches stay on until all the energy is transferred to the output, and then they are opened, isolating the switch node from the load, and initiating the fourth phase of the control loop. This process of the inductor current ramping all the way down as the switch node voltage stays at the output voltage during this phase is also illustrated in signal graph 320c.

Finally, in so-called "Phase IV," represented by circuit 300d, the switch node resonates at the resonant frequency of the LC circuit, as shown by current path 310d. When the voltage reaches the input voltage, then the first two pairs of input switches are turned on again, and the cycle repeats itself again, starting at Phase I. This process of the inductor current beginning to ramp up again once the switch node voltage has reached the input voltage during this phase is also illustrated in signal graph 320d.

Figure 4:
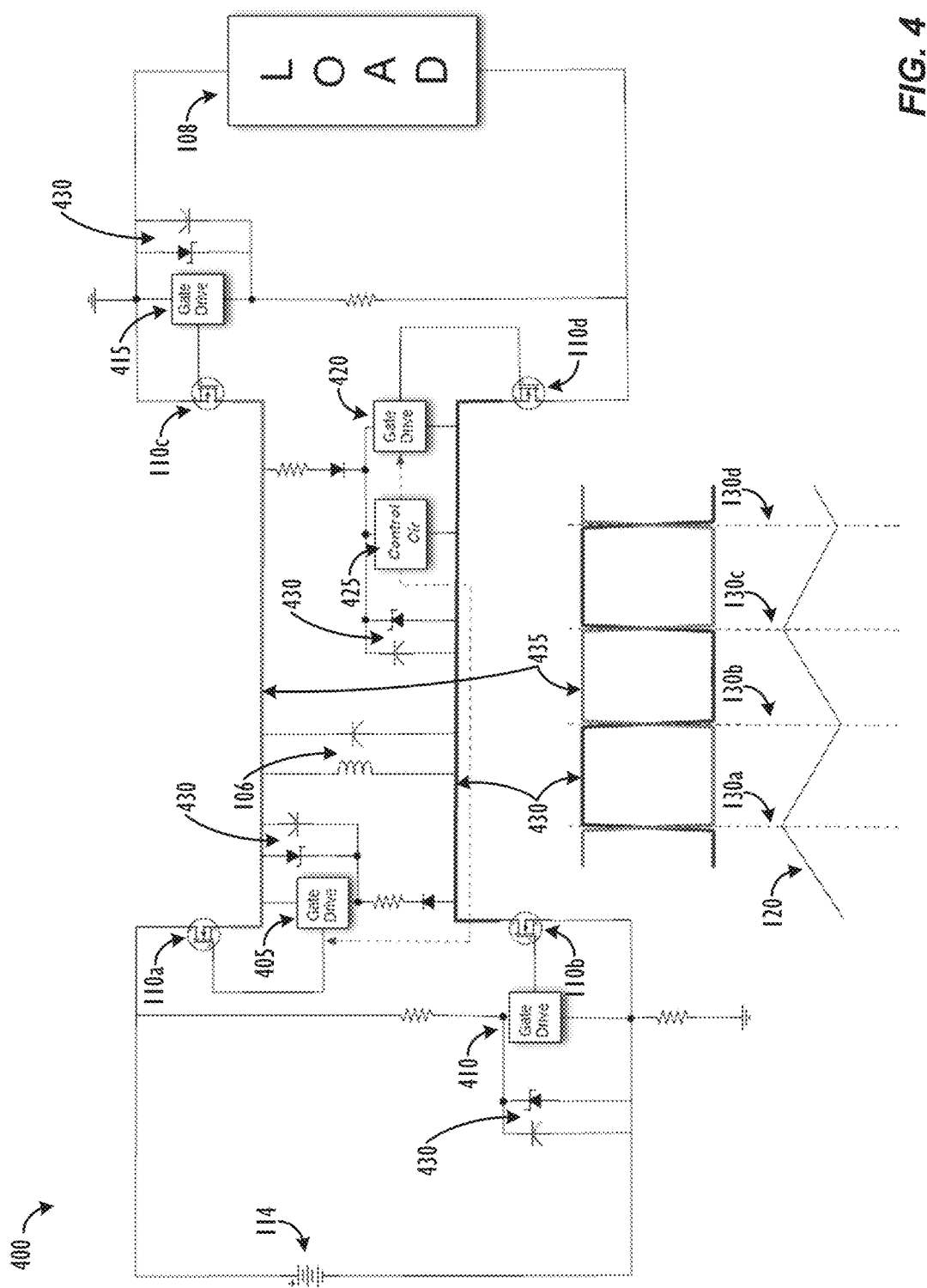
FIG. 4 illustrates an exemplary switch implementation for an exemplary transformerless AC line isolator, in accordance with one embodiment.

Referring now to FIG. 4, an exemplary switch implementation 400 for an exemplary transformerless AC line isolator is illustrated, in accordance with one embodiment. Several of the elements in FIG. 4, i.e., those prefixed with 1xx reference element numerals, refer to the corresponding elements of the same number, as were described in relation to circuit 100 of FIG. 1. Shown in further detail in FIG. 4 is one embodiment of a switching implementation for switches 110a-110d.

In particular, individual gate drive circuits (405/410/415/420) may be used to drive the switches 110a/110b/110c/110d. The gate drive circuits may be provided with an effective regulated DC voltage source, e.g., at 5V, by the combination capacitor/Zener diode circuits 430 shown in conjunction with each of the gate drive circuits. Also shown in FIG. 4 is control circuitry 425. Control circuitry 425 may comprise a microprocessor or other integrated circuit programmed with logic to drive the synchronized switching control loop circuitry according to the 'four phase' scheme described above.

Signal graph 120 on FIG. 4 corresponds to the inductor current signal graph described above with reference to element 120 of FIG. 1. As also shown in FIG. 4, the time points 130a-130d correspond with the times at which the voltage across one leg of the resonant LC circuit (e.g., the bottom leg, represented by darker signal line 430) circuit equals the voltage across the other leg of the resonant LC circuit (e.g., the top leg, represented by lighter signal line 435), which coincides with the current in the inductor changing from a state where it is ramping up to a state where it is ramping down.

In some embodiments, the period of the resonant circuit in both Phase II and Phase IV may be calculated according to Equation 1, below:

$$V_{(t)} = \sqrt{\left[V_{in}^2 + (I_{pk}\sqrt{\frac{L}{C}})^2\right]} * \cos\left(\frac{t}{\sqrt{LC}} + \tan^{-1}\left(\frac{(I_{pk}\sqrt{\frac{L}{C}})}{V_{in}}\right)\right) \quad \text{(Eqn. 1)}$$

For example, if, in Phase II, the input voltage, Vin=120 v and the peak current, Ipk=2.5 A, with an inductor value of L=400 uH and a capacitor value of C=10 nF, then Eqn. 1 above reduces to:

$$\left| V_{(t)} = 323\cos\left(\frac{t}{\sqrt{LC}} + 1.190\right) \right|,$$

and it may be determined that the time it takes the resonant circuit to go from 120V to −120V is 1.52 us.

Likewise, if in Phase IV, for example, the input voltage, Vin=120 v and the peak current, Ipk=0 A, with the same inductor value of L=400 uH and capacitor value of C=10 nF, then Eqn. 1 above reduces to:

$$V_{(t)} = 120\cos\left(\frac{t}{\sqrt{LC}}\right),$$

and it may be determined that the time it takes the resonant circuit to go from −120V to 120V is 6.28 us. The use of Eqn. 1 above may aid in the design of a particular implementation of the transformerless AC line isolator described herein, such that circuit components may be chosen that give adequate time for the switches to changes between the various Phases in a safe manner.

Figure 5:
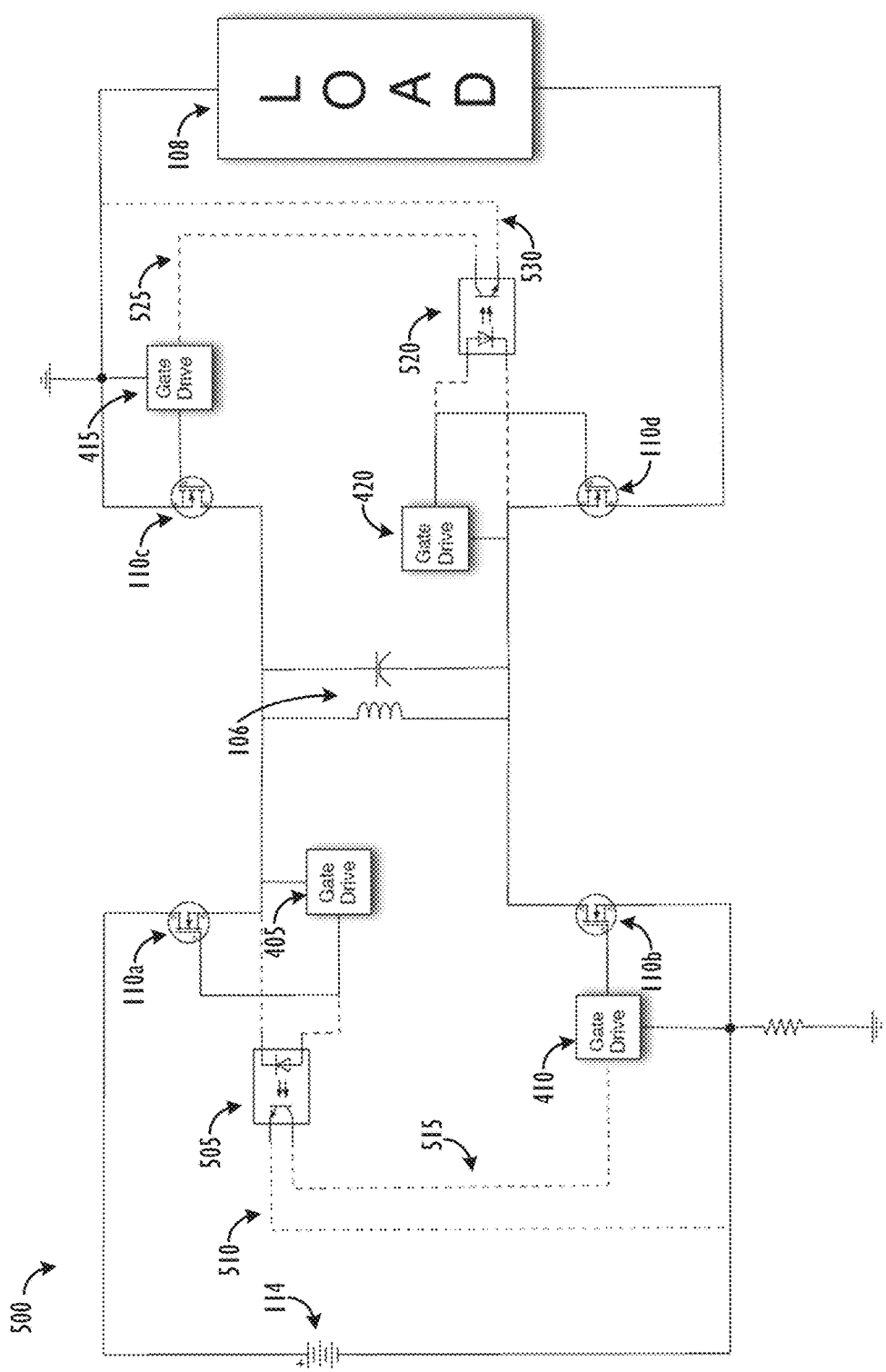
FIG. 5 illustrates exemplary switch communication pathways for an exemplary transformerless AC line isolator, in accordance with one embodiment.

Referring now to FIG. 5, exemplary switch communication pathways for an exemplary transformerless AC line isolator 500 are illustrated, in accordance with one embodiment. In particular, circuit 500 shows the use of various optoisolators 505 and 520 to communicate signals from the input stage to the output stage of the isolator. As may now be understood, during each of the aforementioned Phases, the input stage will be physically isolated from the output stage for safety reasons. However, the switching control loop process depends on highly accurate timing and synchronization of the switches to move the isolator through the four Phases described above. Optoisolators (or other types of isolated couplers) may provide a convenient way to transfer data between two such isolated systems. As is shown in FIG. 5, optoisolator 505 may use pathway 510 and pathway 515 to pass synchronization signals between gate drive 405 and gate drive 410. Likewise, optoisolator 520 may use pathway 525 and pathway 530 to pass synchronization signals between gate drive 415 and gate drive 420.

Figure 6:
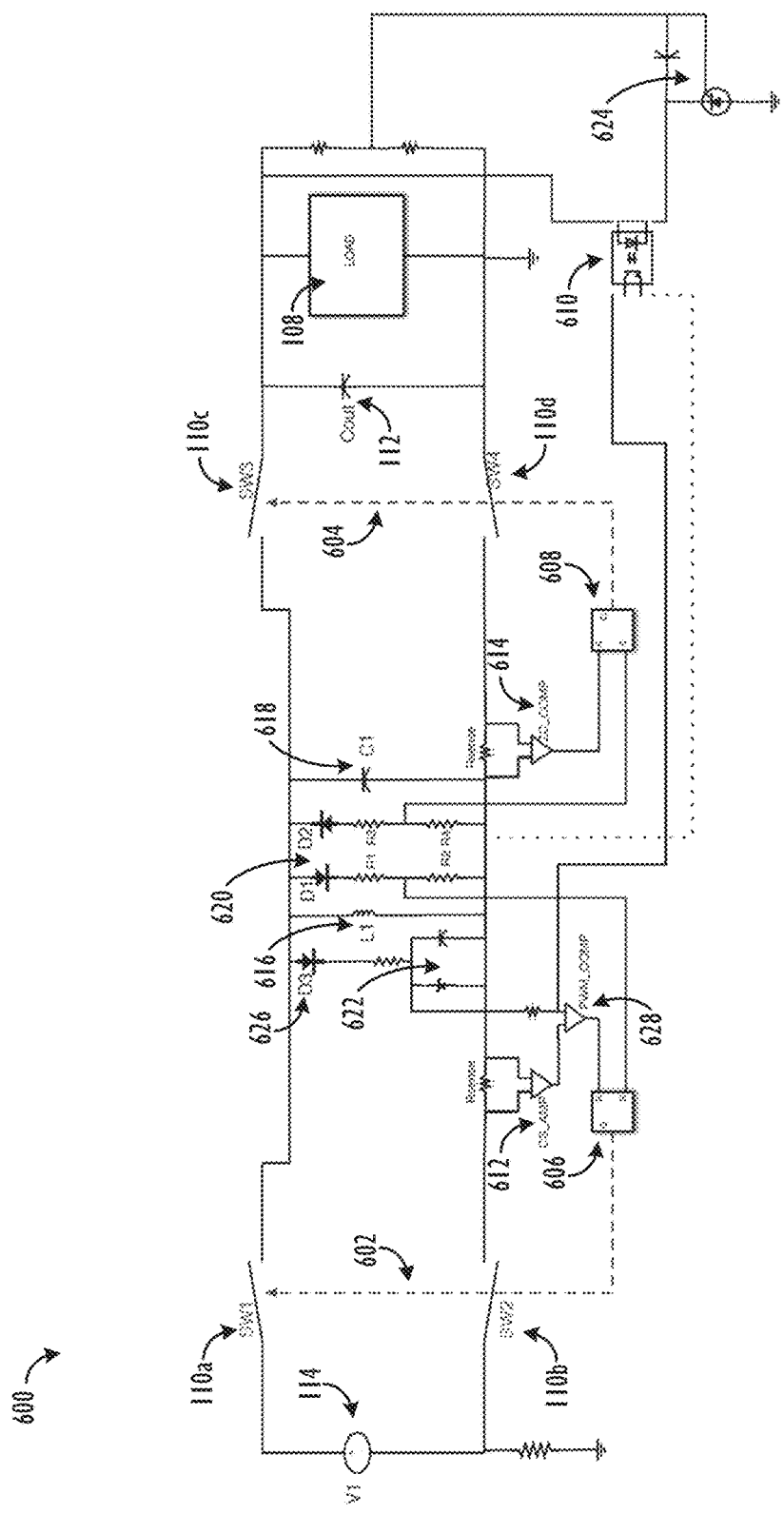
FIG. 6 illustrates an exemplary circuit design for a transformerless AC line isolator, in accordance with one embodiment.

Referring now to FIG. 6, an exemplary circuit design for a transformerless AC line isolator 600 is illustrated in further detail, in accordance with one embodiment. FIG. 6 provides additional detail to the circuitry described above in reference to FIGS. 1, 3, 4, and 5. In particular, flip-flops 606 and 608 are shown in FIG. 6. According to some embodiments, flip-flops 606 and 608 may be used to drive the operation of switches 110a/110b and switches 110c/110d, respectively, via pathways 602 and 604, respectively, to regulate the output voltage of the power converter. In effect, flip-flops 606 and 608 "store" the output of circuitry 620 (comprising diodes D1 and D2, and resistors R1-R4), which reflects the current traveling through the resonant LC circuit (comprising inductor L1 616 and capacitor C1 618), until being reset by the output of comparators 628 and 614, respectively, going high. In this way, flip-flops 606 and 608 provide functionality that is analogous to a latch, i.e., holding a given set value until they are reset by another signal going high on a reset pin.

More particularly, in the input stage, circuitry 626 and 622 provide a regulated voltage input to comparator 628, which is compared with the output of current sense amplifier 612, sensing the current flowing in the input stage. The reset pin (R) of flip-flop 606 will go high when the output of current sense amplifier 612 is higher than the regulated voltage provided by circuitry 622/626, causing switches 110a and 110b to turn off. Likewise, in the output stage, zero-crossing comparator 614 senses the current flowing in the output stage, and waits to reset the flip-flop 608 until there is a zero-crossing event. The set pin (S) of flip-flop 608 will go high when the resonant circuit inverts and will go low when the current is isolated in the resonant circuit, allowing the flip-flop 608 output signal (Q) to turn off, and causing switches 110c/110d to open again. Finally, optoisolator 610 may be used, in conjunction with regulator circuitry 624, to provide output voltage feedback to the input stage in an isolated manner.

Figure 7:
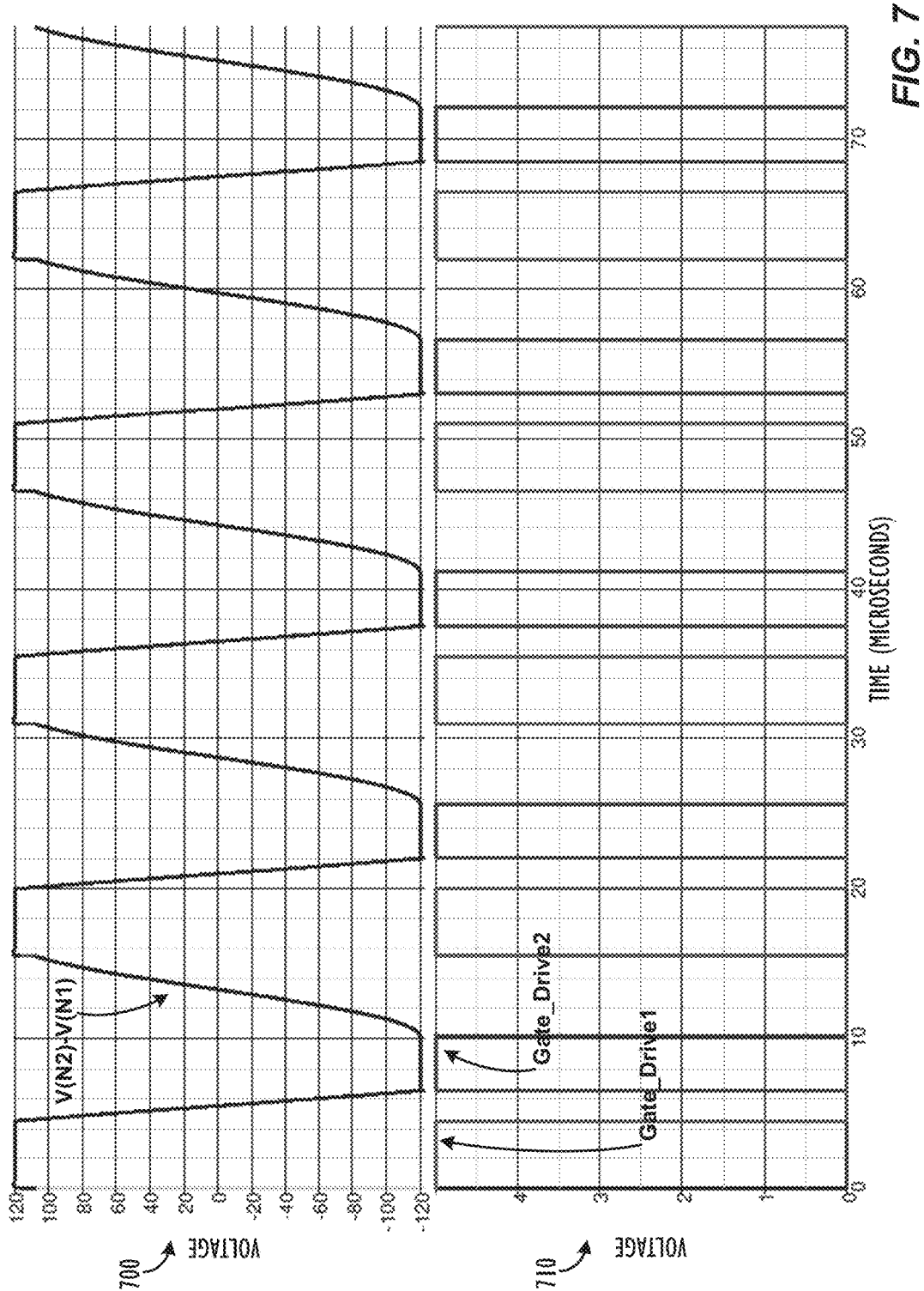
FIG. 7 illustrates exemplary signal graphs for a transformerless AC line isolator utilizing a resonance LC tank circuit with ZVS, in accordance with one embodiment.

Referring now to FIG. 7, exemplary signal graphs for a transformerless AC line isolator utilizing a resonant LC tank circuit with ZVS are illustrated, in accordance with one embodiment. Signal graph 700 represents the switch node voltage, V(N1)−V(N2), over time. As is shown, the switch node may oscillate between typical values of around −120V to 120V, depending on that status and timing of the opening and closing of the input and output switching devices. Signal graph 710 represents the changing gate drive voltages over time. As is shown, the gate drives may operate at typical 5V levels. As may now be appreciated, according to the exemplary signal graphs 700/710 for a transformerless AC line isolator utilizing a resonance LC tank circuit employing ZVS, the Gate Drive 1 signal (operating the input stage gates) and the Gate Drive 2 signal (operating the output stage gates) turn on and turn off only when the switch voltage has reached the optimal 'turn on' voltage. Because of this switching scheme, switching losses no longer dominate the efficiency profile, and the efficiency is greatly improved over the 65% efficiency discussed above with respect to FIG. 2.

Figure 8:
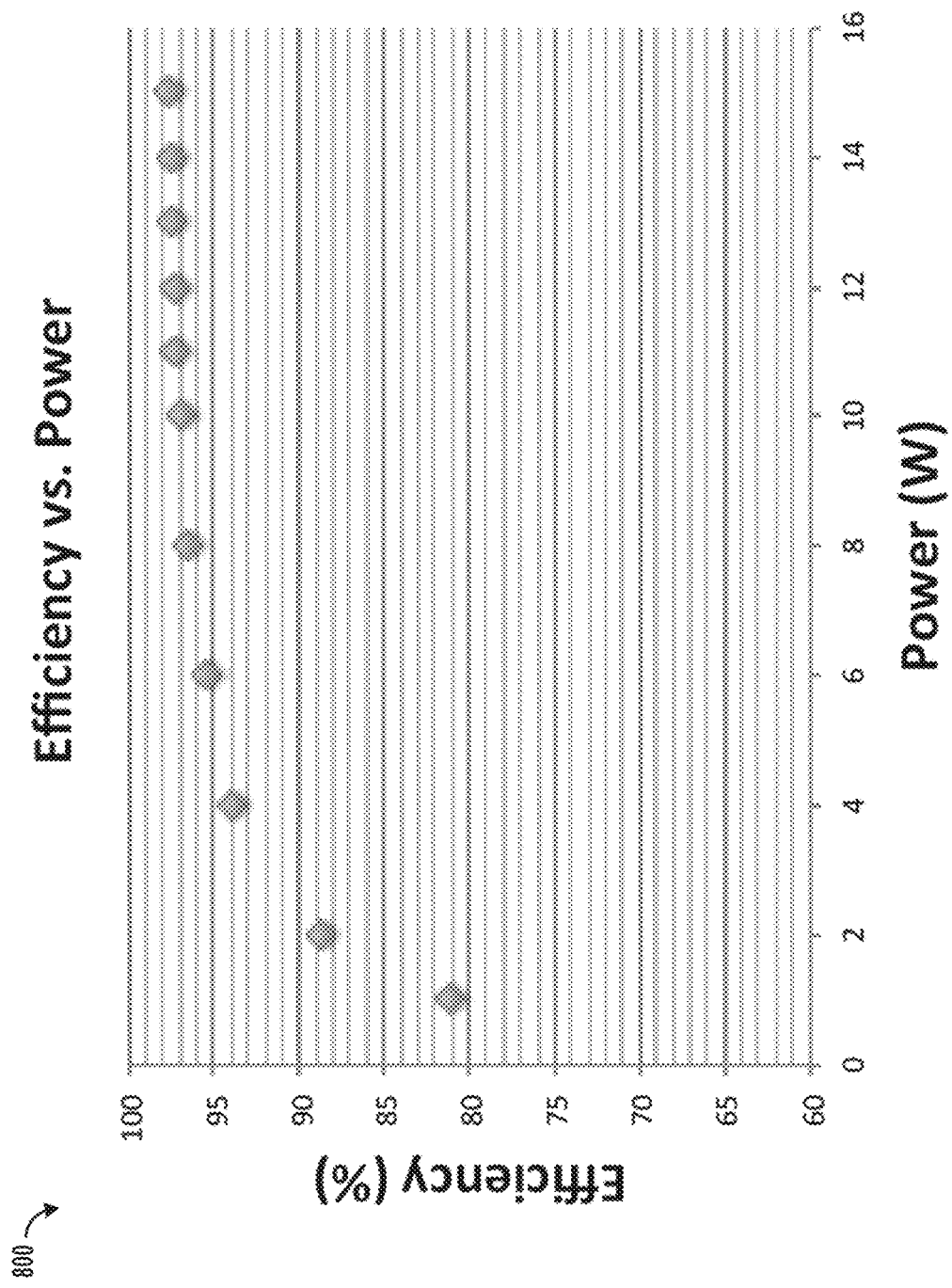
FIG. 8 illustrates an efficiency profile for a transformerless AC line isolator utilizing a resonance LC tank circuit with ZVS in graph form, in accordance with one embodiment.

Referring now to FIG. 8, an efficiency profile 800 for a transformerless AC line isolator utilizing a resonance LC tank circuit with ZVS is illustrated in graph form, in accordance with one embodiment. As may be seen in graph 800, the efficiency increases as output power increases, and peaks around 97% efficiency at 10 W.

Figure 9:
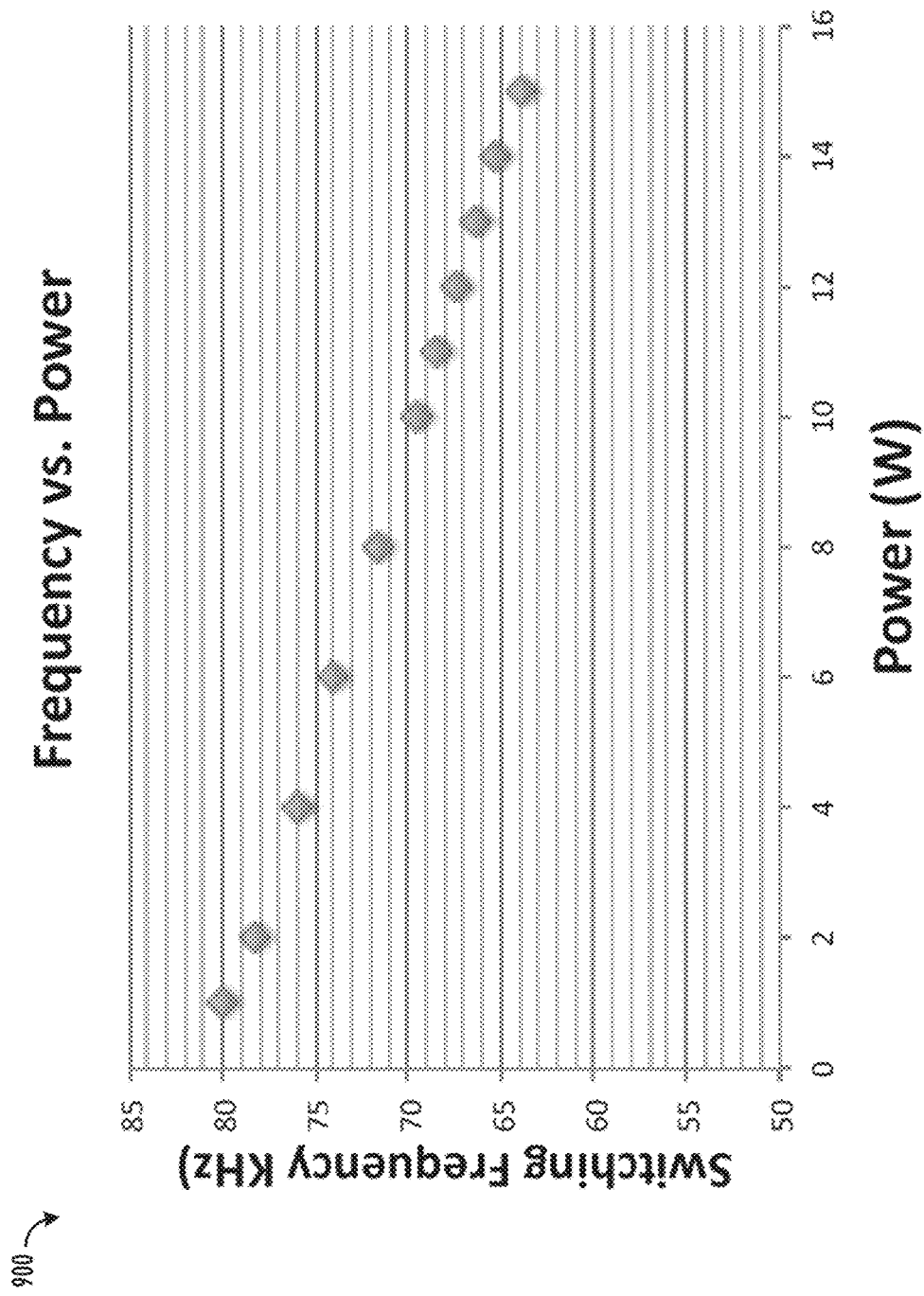
FIG. 9 illustrates a switching frequency profile for a transformerless AC line isolator utilizing a resonance LC tank circuit with ZVS in graph form, in accordance with one embodiment.

Referring now to FIG. 9, an switching frequency profile 900 for a transformerless AC line isolator utilizing a resonance LC tank circuit with ZVS is illustrated in graph form, in accordance with one embodiment. As may be seen in graph 900, the resonant/optimum switching frequency decreases as output power increases, and ranges between 60 kHz and 80 kHz at typical output power values.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:

1. An electrically-isolated power conversion circuit comprising:
    a link stage incorporating a resonant LC circuit, the resonant LC circuit comprising a first inductor and a first capacitor;
    an input stage comprising at least two simultaneously operated input switching devices that, in a closed position, couple the resonant LC circuit to an input power source and that, in an open position, isolate the resonant LC circuit from the input power source;
    an output stage comprising at least two simultaneously operated output switching devices that, in a closed position, couple the resonant LC circuit to a load and that, in an open position, isolate the resonant LC circuit from the load; and
    a control system operatively coupled to the input and output stages configured to prevent the input switching devices and the output switching devices from closing at the same time, thereby providing electrical isolation between the input power source and the load without the use of a transformer.

2. The power conversion circuit of claim 1, wherein the input switching devices open when peak current in the first inductor reaches a threshold value.

3. The power conversion circuit of claim 1, wherein the power conversion circuit does not contain a transformer.

4. The power conversion circuit of claim 1, wherein at least one of the input switching devices or the output switching devices comprises a Silicon Carbide (SiC) MOS-FET.

5. The power conversion circuit of claim 1, wherein the link stage operates in a resonant mode when each of the input switching devices and output switching devices are in their open position.

6. The power conversion circuit of claim 1, wherein the control system is further configured to place the input switching devices into their closed position when a voltage measured across the resonant LC circuit reaches an input voltage level.

7. The power conversion circuit of claim 1, wherein the control system is further configured to place the output switching devices into their closed position when a voltage measured across the resonant LC circuit reaches an output voltage level.

8. The power conversion circuit of claim 1, further comprising at least one optocoupler configured to transfer electrical signals between the output stage and the input stage and synchronize the operation of the input switching devices and the output switching devices.

9. A method of operating an electrically isolated power conversion circuit, the method comprising:
    closing at least two simultaneously operated input switching devices that, in a closed position, couple a resonant LC circuit to an input power source and that, in an open position, isolate the resonant LC circuit from the input power source to transfer energy to the resonant LC circuit;
    opening the input switching devices thereby isolating the LC resonant circuit from the input power source and allowing the resonant LC circuit to begin resonating;
    allowing the resonance to continue until the voltage across the resonant LC circuit inverts, and then closing at least two simultaneously operated output switching devices that, in a closed position, couple the resonant LC circuit to a load and that, in an open position, isolate the resonant LC circuit from the load, thereby transferring energy from the resonant LC circuit to the load;
    opening the output switching devices when the current from the resonant LC circuit to the load reaches zero, thereby isolating the LC resonant circuit from the load; and
    allowing the resonant LC circuit to continue resonating until the voltage across the resonant LC circuit again inverts, and then closing the input switching devices under a zero voltage condition.

10. The method of claim 9, further comprising opening the input switching devices when peak current in the first inductor reaches a threshold value.

11. The method of claim 9, wherein the power conversion circuit does not contain a transformer.

12. The method of claim 9, wherein at least one of the input switching devices or the output switching devices comprises a Silicon Carbinde (SiC) MOS-FET.

13. The method of claim 9, further comprising closing the input switching devices when a voltage measured across the resonant LC circuit reaches an input voltage level.

14. The method of claim 9, further comprising closing the output switching devices when a voltage measured across the resonant LC circuit reaches an output voltage level.

15. The method of claim 9, further comprising transferring, by at least one optocoupler, electrical signals between the output switching devices and the input switching devices.

16. The method of claim 15, further comprising synchronizing, by the at least one optocoupler, the operation of the input switching devices and the output switching devices.

17. An electrically-isolated power conversion apparatus comprising:
    a power source for generating an input voltage;
    a power converter comprising: an input system; and output system; and one or more switching devices, the one or more switching devices further comprising first input switching devices and first output switching devices;
    a controller configured to operate the one or more switching devices, so as to convert an input voltage of the input system to a regulated output voltage for delivery to a load in the output system according to a control loop process, wherein:
        a first phase of the control loop process comprises:
            closing the first input switching devices to transfer energy from the power source to a resonant LC circuit, wherein the resonant LC circuit is connected between the power source and the load; and
            opening the first output switching devices to electrically isolate the load from the input voltage;
        a second phase of the control loop process comprises:
            opening the first input switching devices to allow the resonant LC circuit to resonate until a voltage across the resonant LC circuit inverts;
        a third phase of the control loop process comprises:
            closing the first output switching devices to transfer energy from the resonant LC circuit to the load; and
        a fourth phase of the control loop process comprises:
            opening the first output switching devices when a current from the resonant LC circuit to the load reaches zero;
            allowing the resonant LC circuit to continue resonating until the voltage across the resonant LC circuit again inverts; and closing the first input switching devices under a zero voltage condition.

18. The power conversion apparatus of claim 17, wherein the power converter does not contain a transformer.

19. The power conversion apparatus of claim 17, wherein at least one of the first input switching devices or the first output switching devices comprises a Silicon Carbide (SiC) MOS-FET.

20. The power conversion apparatus of claim 17, further comprising at least one optocoupler configured to transfer electrical signals between the output system and the input system.

\* \* \* \* \*